Jan. 8, 1924.
L. H. MATTINGLY
1,480,002
SHAFT COUPLING MEMBER AND METHOD OF MANUFACTURING THE SAME
Filed Aug. 1, 1922
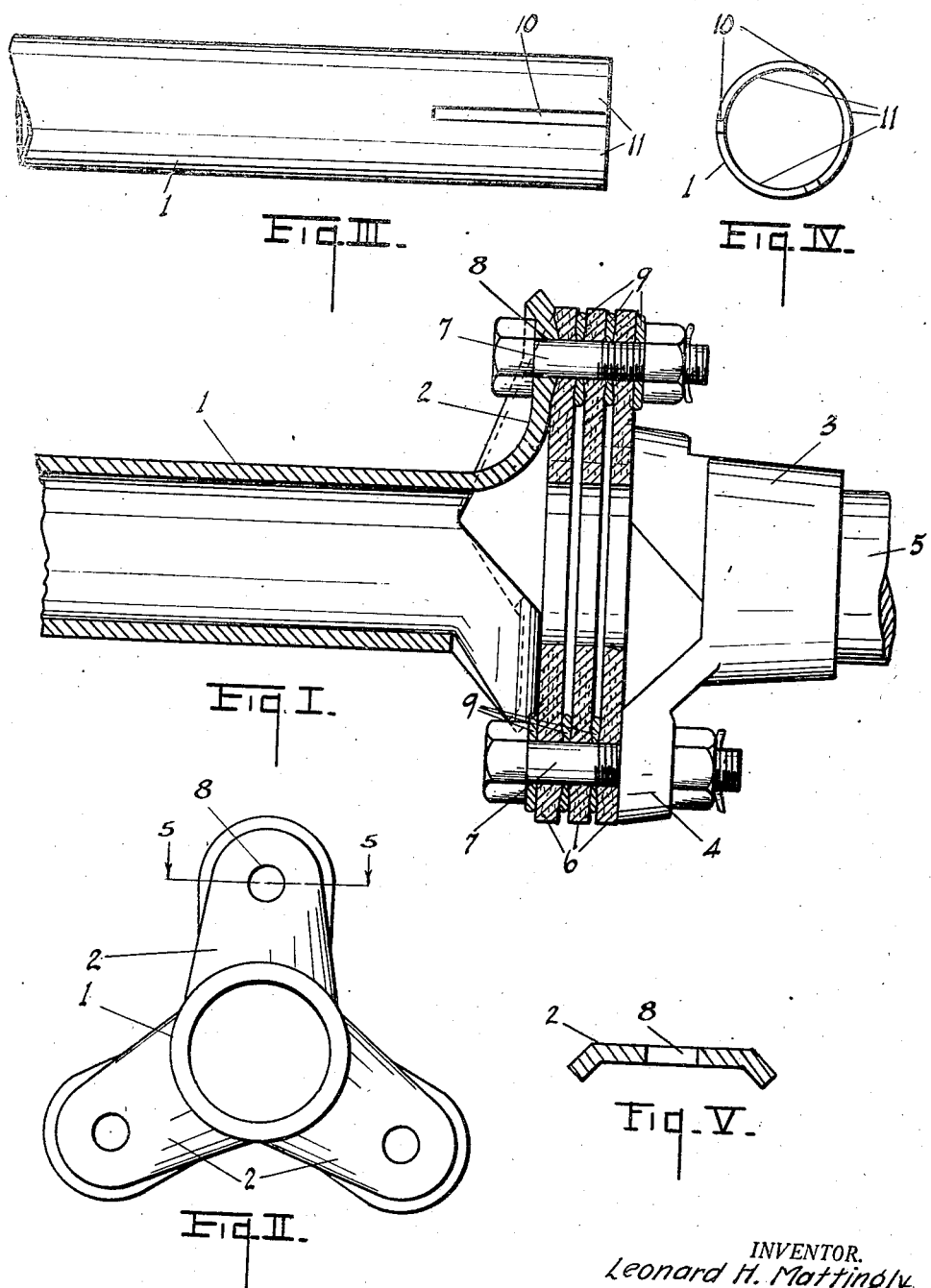
INVENTOR.
Leonard H. Mattingly
BY
ATTORNEYS.

Patented Jan. 8, 1924.

1,480,002

UNITED STATES PATENT OFFICE.

LEONARD H. MATTINGLY, OF ALLEGAN, MICHIGAN.

SHAFT-COUPLING MEMBER AND METHOD OF MANUFACTURING THE SAME.

Application filed August 1, 1922. Serial No. 578,938.

*To all whom it may concern:*

Be it known that I, LEONARD H. MATTINGLY, a citizen of the United States, residing at Allegan, county of Allegan, State of Michigan, have invented certain new and useful Improvements in Shaft-Coupling Members and Method of Manufacturing the Same, of which the following is a specification.

This invention relates to improvements in shaft coupling members and the method of manufacturing the same.

The main objects of this invention are:

First, to provide an improved shaft coupling member integral or as a part of a propeller shaft or the like adapted for use in universal joints of the disk type.

Second, to provide an improved method of manufacturing shaft members having coupling arms integral therewith.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a detail side view of a shaft embodying the features of my invention, partially in central longitudinal section.

Fig. II is an end view of a shaft member embodying the features of my invention.

Fig. III is a side view of a piece of tubular shafting illustrating the first step in the manufacture of my improved shafting.

Fig. IV is an end view looking from the right of Fig. III.

Fig. V is a cross section through one of the arms of the shaft member on a line corresponding to line 5—5 of Fig. II.

In the drawing similar reference characters refer to similar parts throughout the several views.

Referring to the drawing, my improved shaft coupling comprises a tubular shaft 1 provided with integral radially disposed coupling arms 2. These arms are of channel cross section as illustrated in Figs. I, II and V.

I provide a coacting shaft member 3 having radially disposed arms 4. The shaft section 5 is secured to the shaft member 3 in any suitable manner.

I also provide a plurality of flexible coupling disks 6 which are secured to the arms 2 and 4 by means of bolts 7 which are arranged through holes 8 in the arms 2 and 4 through the disks and also through the disk-like spacing members 9 which are arranged on the bolts between the disks.

In the manufacture of my improved shaft I utilize a tubular shaft forming longitudinal slots 10 therein at one end, thus providing the segments 11 of uniform width. The segments 11 between these slots are bent outwardly and simultaneously conformed into the channel-shaped arms 2, the channels facing outwardly. This shape makes the arms very rigid, the same being entirely sufficient to carry the load of a driving shaft or propeller shaft.

The structure is comparatively light in weight, thus making it especially desirable for the driving shaft of a motor vehicle and for embodiment in a universal joint of the disk type as I have illustrated it.

Having thus described my invention, what I claim as new and desire to secure by Letters Patent, is:

1. A shaft coupling comprising a tubular shaft member provided at one end with a plurality of radially disposed coupling arms of channel cross section facing outwardly and formed integrally with said shaft.

2. The method of manufacturing shaft coupling members consisting of longitudinally slotting a tubular shaft at one end, bending the segments formed by the slots into radially disposed arms, and simultaneously conforming to an outwardly facing channel cross section.

3. The method of manufacturing shaft coupling members consisting of longitudinally slotting a tubular shaft at one end, and bending and conforming the segments formed by the slots into radially disposed arms.

In witness whereof I have hereunto set my hand and seal in the presence of two witnesses.

LEONARD H. MATTINGLY. [L. S.]

Witnesses:
MARJORIE M. COLE,
MILTON R. FOX.